United States Patent [19] [11] 4,228,535
Workman et al. [45] Oct. 14, 1980

[54] DUAL TDM SWITCHING APPARATUS

[75] Inventors: Harold W. Workman; David C. Nicholas, both of Cedar Rapids, Iowa

[73] Assignee: Rockwell International Corporation, El Segundo, Calif.

[21] Appl. No.: 15,028

[22] Filed: Feb. 26, 1979

[51] Int. Cl.³ .................... H04Q 11/04; H04J 3/14
[52] U.S. Cl. ........................................ 370/16; 370/63
[58] Field of Search ........ 179/15 AT, 15 BF, 175.2 R; 370/63, 58, 59, 16

[56] References Cited

U.S. PATENT DOCUMENTS

| 3,828,136 | 8/1974 | Perna et al. | 179/15 AT |
| 3,886,318 | 5/1975 | Charransol et al. | 179/15 BF |
| 3,959,596 | 5/1976 | Bojanek et al. | 179/15 AT |
| 4,059,736 | 11/1977 | Perucca et al. | 179/175.2 R |
| 4,081,611 | 3/1978 | Bovo et al. | 179/15 AT |

Primary Examiner—Douglas W. Olms
Attorney, Agent, or Firm—Bruce C. Lutz; Howard R. Greenberg; H. Fredrick Hamann

[57] ABSTRACT

Two identical and interconnected switch matrices are used wherein one is "on-line" and the other is "off-line". If an individual module in the on-line switch fails, an identical module in the standby matrix is switched in to carry traffic. The failed module can then be replaced with an operable unit. The feature of modularity not only greatly enhances the performance of the switch matrix but also provides for quick restoration of the switching apparatus to a preferred configuration of operability.

15 Claims, 9 Drawing Figures

4,228,535

DUAL TDM SWITCHING APPARATUS

THE INVENTION

The present invention relates generally to electronics, and more specifically to communication switching. Even more specifically, it relates to apparatus for increasing the reliability of a communication switching matrix through a modularity approach allowing individual portions of a standby switch to be used as a temporary replacement for failed units in the on-line switch.

As is realized by those skilled in the art, the failure of a small portion of a TDM switching network can result in a large number of lost calls in switching from the on-line network to a standby switching network. Further, the prior art switching networks were designed such that if a part failed in the on-line switching network, after it was placed on standby, the whole unit needed to be deactivated and worked upon. In other words, there was no backup for the standby unit recently placed in service.

In view of these and other problems, the present dual matrix was designed in a modular fashion such that one or more modules in the on-line matrix can fail and be replaced on a module-by-module basis from the standby matrix. Repairmen can, on a similar basis, remove the modules from the on-line unit one by one, repair them and replace these modules back in service.

It is, therefore, an object of the present invention to provide improved reliability in a large switching matrix.

Other objects and advantages of the present invention will be apparent from a reading of the specification and appended claims in conjunction with the drawings wherein:

Figure 1:
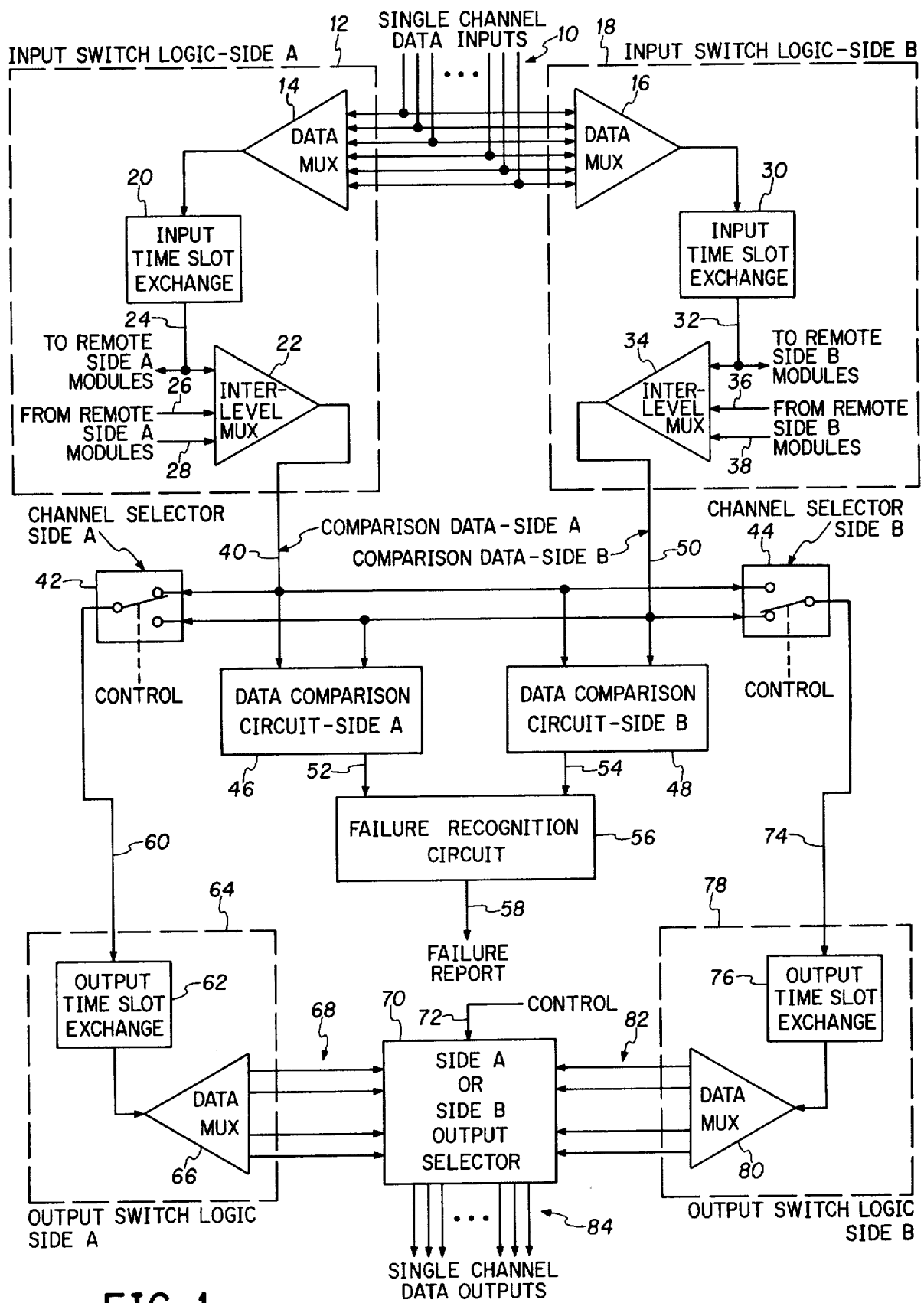
FIG. 1 is a block diagram of an individual TST (time-space-time) switch level comprising two modules.
Figure 3:
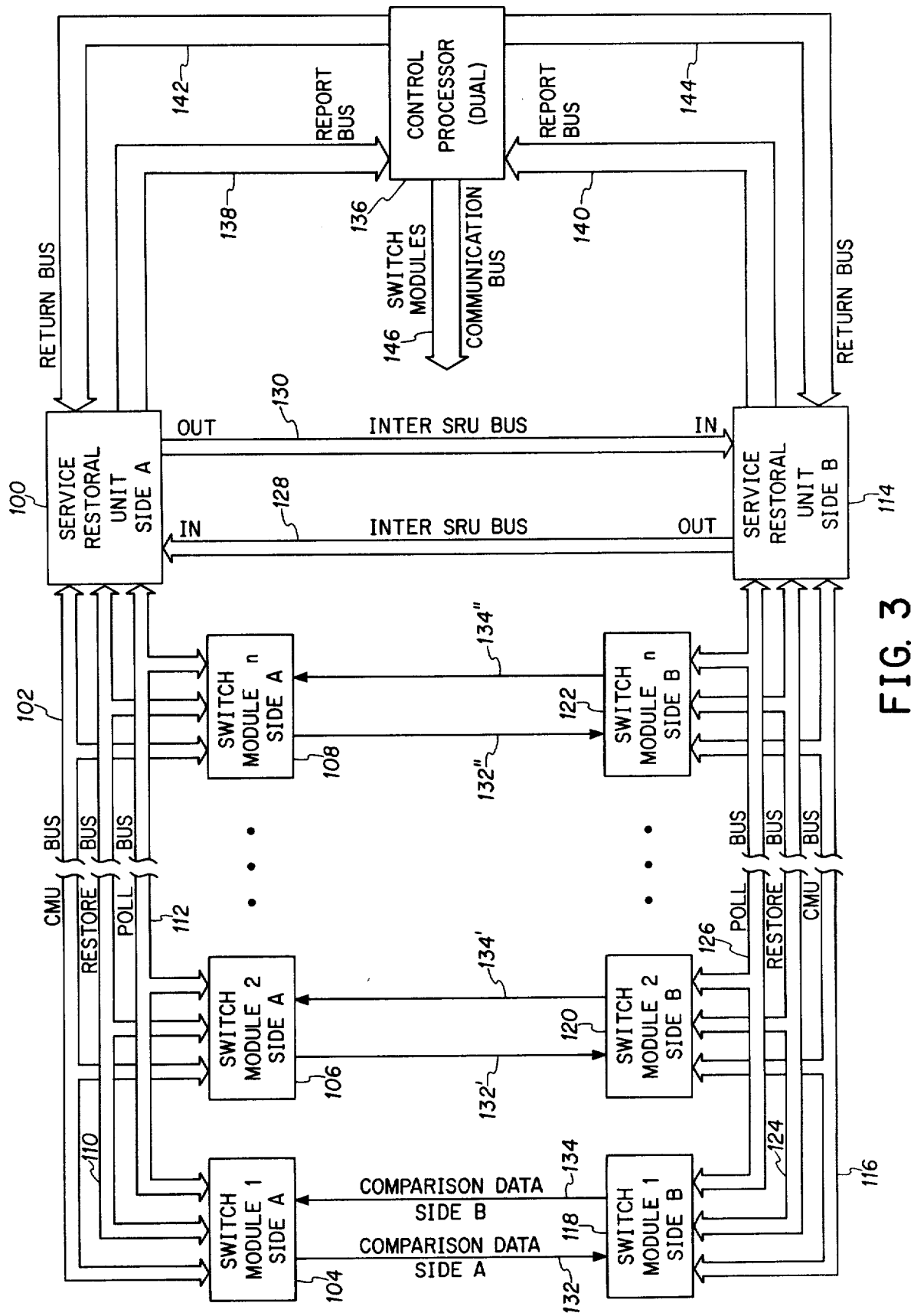
FIG. 3 is a more detailed block diagram of the apparatus of FIG. 2 shown in somewhat different format.
Figure 5:
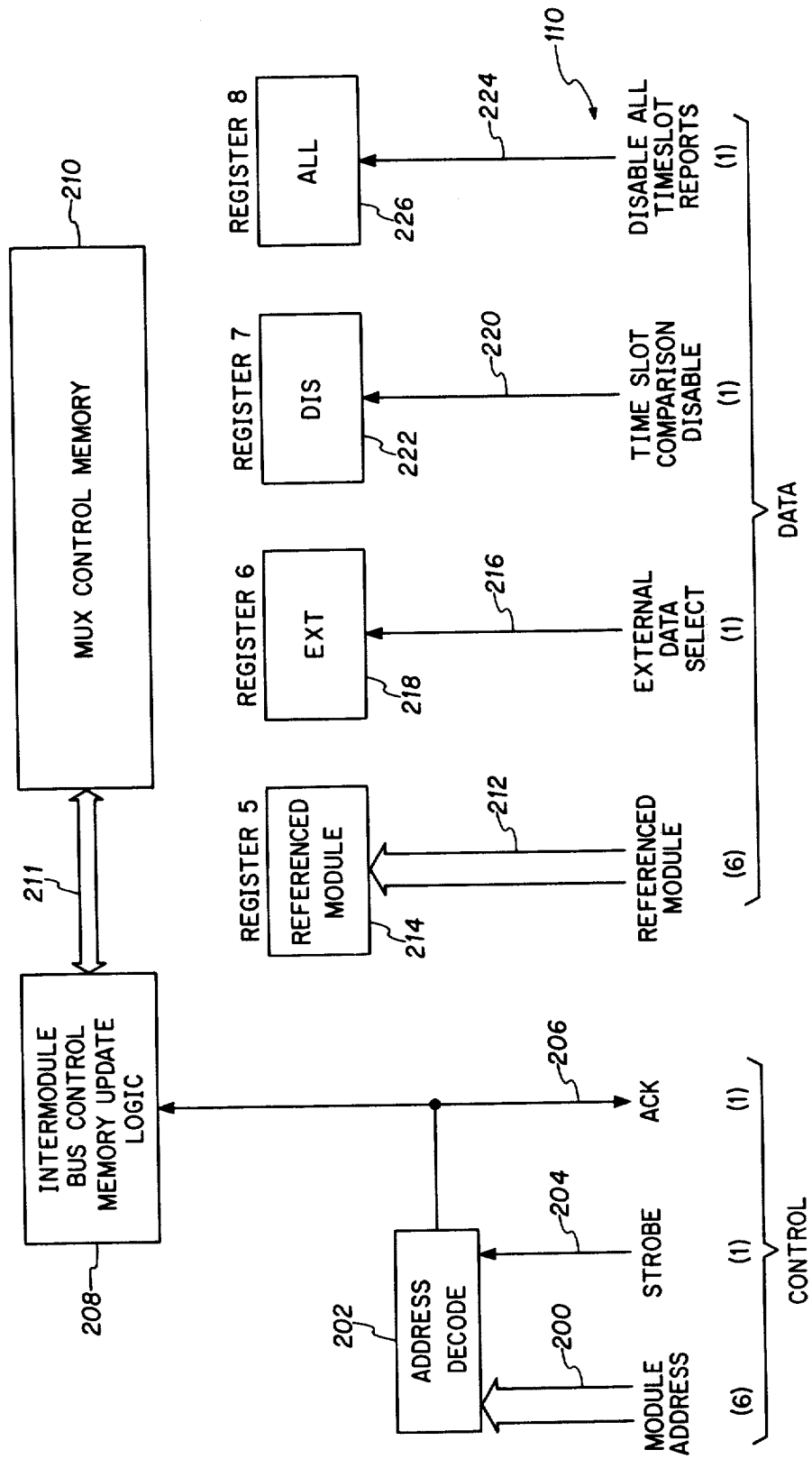
Figure 6:
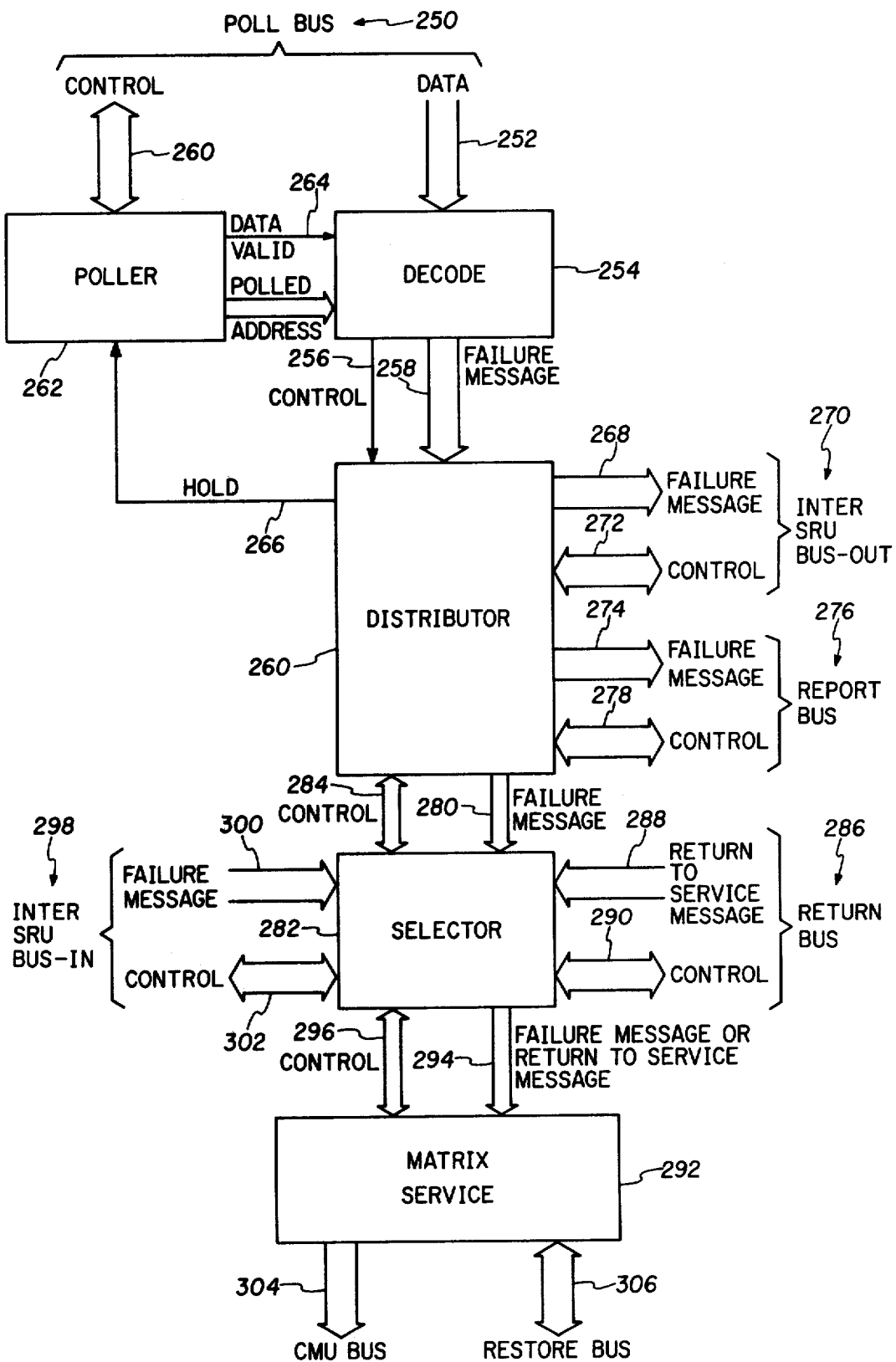
Figure 7:
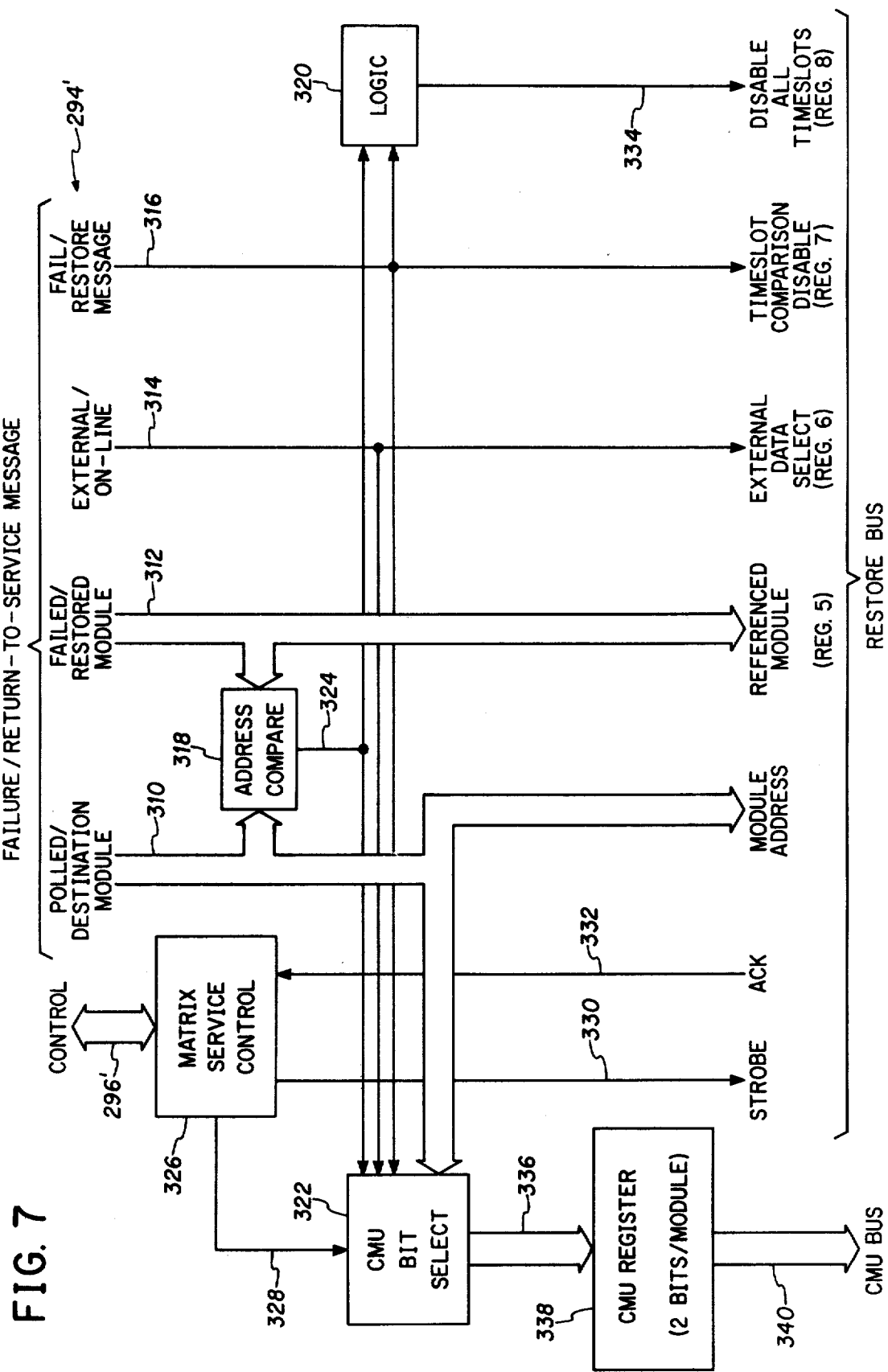
Figure 8:
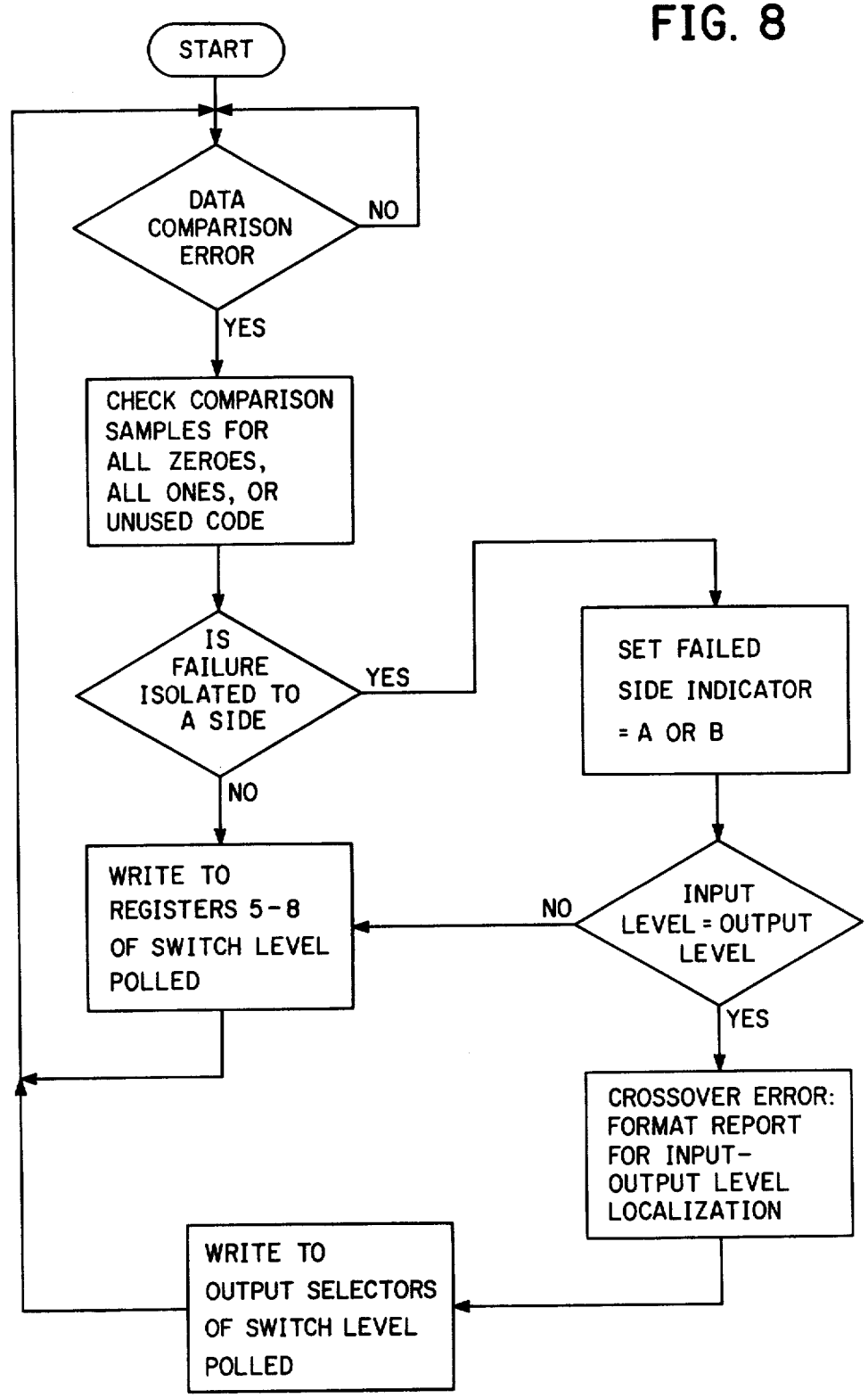
Figure 9:
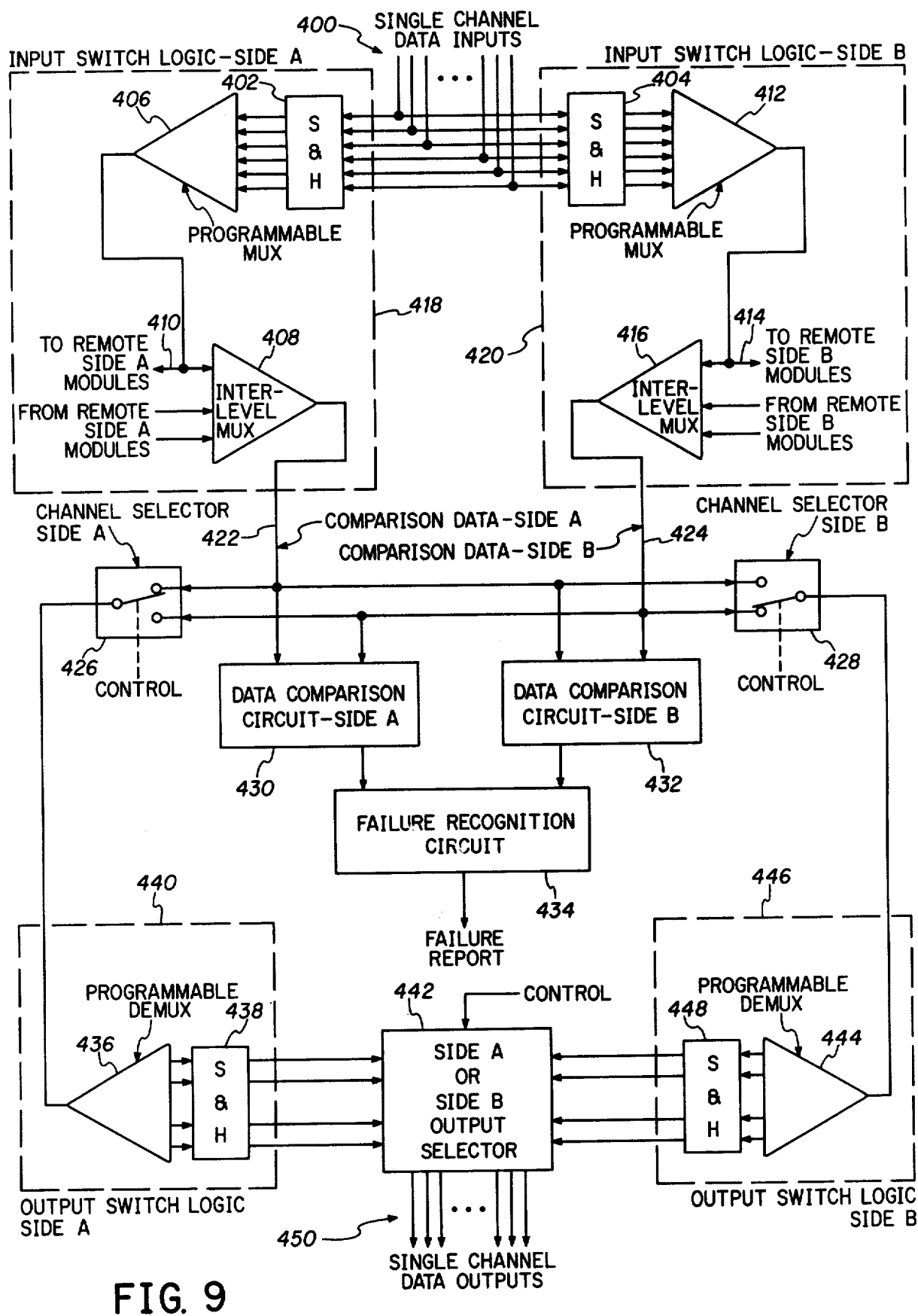

FIG. 5 provides more details on the service restoral unit blocks of FIG. 3;

FIG. 6 provides more details on the restore bus used in explaining FIG. 3;

FIG. 7 provides a block diagram of the matrix service logic block of FIG. 6;

FIG. 8 is a flow diagram illustrating the operation of the service restoral unit of FIG. 5; and FIG. 9 is a block diagram of an individual SSS (space-space-space) switch level similar to that of FIG. 1.

DETAILED DESCRIPTION

FIG. 1 illustrates the general switch matrix module utilized in the present invention and the fault isolation hardware. Each module comprises a side A and an identical side B. As illustrated, a plurality of input leads 10 are supplied to a dash line block 12 entitled input switch logic-side A and to a data multiplex device 14 included within block 12. The input leads 10 are also supplied to a data multiplexer 16 within a dash line block 18 labeled input switch logic-side B. The multiplexed signals from multiplexer 14 are supplied to an input time slot exchange block 20 whose output signals are supplied to an interlevel or space multiplexing unit 22 and also supplied on a lead 24 to other side A modules on other switch levels. Multiplexer 22 also receives further inputs as illustrated on leads 26 and 28 from input time slot exchange blocks in remote side A modules. In a similar fashion, data multiplex block 16 supplies signals to an input time slot exchange 30 which provides signals on a lead 32 to an interlevel or space multiplexing unit 34 as well as to similar multiplexers in remote side B modules on other levels. Likewise, leads 36 and 38 provide input signals from other input time slot exchange units of remote side B modules. The interlevel multiplex data from multiplexer 22 is supplied on a lead 40 to a channel selector block 42 for side A as well as to channel selector 44 for side B and also to a data comparison circuit 46 for side A and a data comparison circuit 48 for side B. In a similar fashion the output signals from multiplexer 34 are supplied on a lead 50 to blocks 42, 44, 46 and 48. Output signals from data comparison circuits 46 and 48 are supplied on leads 52 and 54 to a failure recognition circuit 56 which provides failure reports on a lead 58 to a processor so that failed modules can be removed and repaired. The block 42 supplies signals on a lead 60 to an output time slot exchange block 62 within a dash line block 64 labeled output switch logic-side A. The exchange block 62 provides signals to a data multiplexer 66 which provides a serial to parallel multiplex function. The output of block 66 comprises a plurality of leads generally labeled 68 which are supplied to an output selector block 70. Output selector block 70 also receives control input signals on one or more leads 72 from a processor not shown in this figure. Output signals from selector 44 are provided on a lead 74 to an output time slot exchange 76 within a dash line block 78 also labeled output switch logic-side B. Signals from exchange 76 are converted from serial to parallel in a data multiplexer 80 which provides the parallel output signals to the selector block 70 via a plurality of leads generally designated as 82. Selector block 70 provides a plurality of single channel data output signals on a plurality of leads designated as 84.

As shown, FIG. 1 uses as its three switching stages time-space-time. In FIG. 9 (later described) the three stages of switching are space-space-space. As will be realized from an appreciation of the invention, the concept also applies to other combinations of stages to form a switching level or modules.

Figure 2:
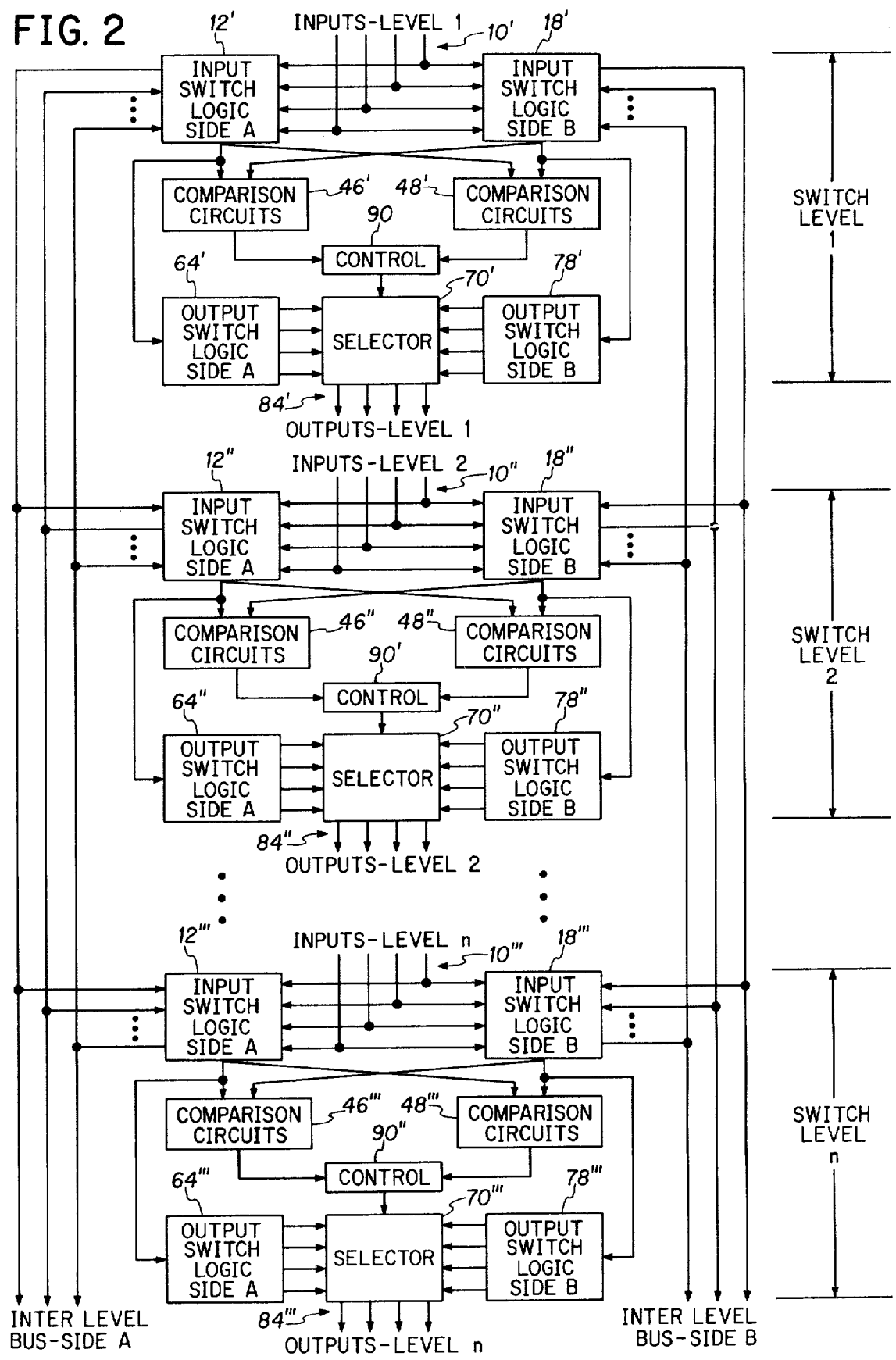
FIG. 2 is a block diagram of an entire switch matrix incorporating a plurality of switch levels each one of which is basically that illustrated in FIG. 1.

In FIG. 2, there are a plurality of switch levels of which switch levels 1, 2 and n are shown with the three dots indicating a plurality of intermediate levels. In one embodiment of the invention there were 61 intermediate levels between switch level 2 and switch level n. As will be noted, blocks which perform the same function, as illustrated in FIG. 1, are designated with a 'or" in FIG. 2. The only additional block illustrated in FIG. 2 is a control block 90 which acts in response to signals from the comparison circuits to activate the selector block 70. While control block 90 may advantageously be a processor, it can also be implemented in accordance with the circuitry and information provided with FIGS. 3 through 7.

A service restoral unit side A block 100 is shown in FIG. 3 having a CMU output bus 102. Bus 102 is connected to a plurality of switch modules. As shown, the modules are labeled switch modules 1 through n and are numbered 104, 106 and 108. Referring to FIG. 2, the modules 104 through 108 would be comparable to the left-hand side of each of the switch levels of FIG. 1 or FIG. 2 and would include the blocks 12, 46 and 64. A restore bus designated as 110 transfers information between each of the switch modules and the service restoral unit block 100. Finally, a poll bus 112 also supplies information between each of the side A modules and the service restoral unit block 100. A second service restoral unit block for side B designated as 114 has a similar CMU bus 116 supplying signals to side B switch modules 118, 120 and 122. One implementation of this circuit used 64 modules and thus 61 modules are represented by the dots between modules 2 and n. A restore bus 124 provides two-way transfer of information between the modules and the side B restoral unit block 114. A poll bus 126 provides a similar transfer of information. An inter SRU bus 128 provides information from the block 114 to block 100 while a second bus 130 provides transfer of information from block 100 to block 114. It will be further noticed that each of the modules has a line such as 132 providing information from the side A module to the same level side B module. Likewise, a line 134 provides comparison data from the side B module to the same level side A module. A control processor 136 receives information from each of blocks 100 and 114 via report buses 138 and 140 respectively. On the other hand, information is supplied to each of these restoral unit blocks via return buses 142 and 144 respectively. Finally, a communication bus 146 provides signals directly from control processor 136 to each of the switch modules previously designated such as 104 and 118 on each switch level.

Figure 4:
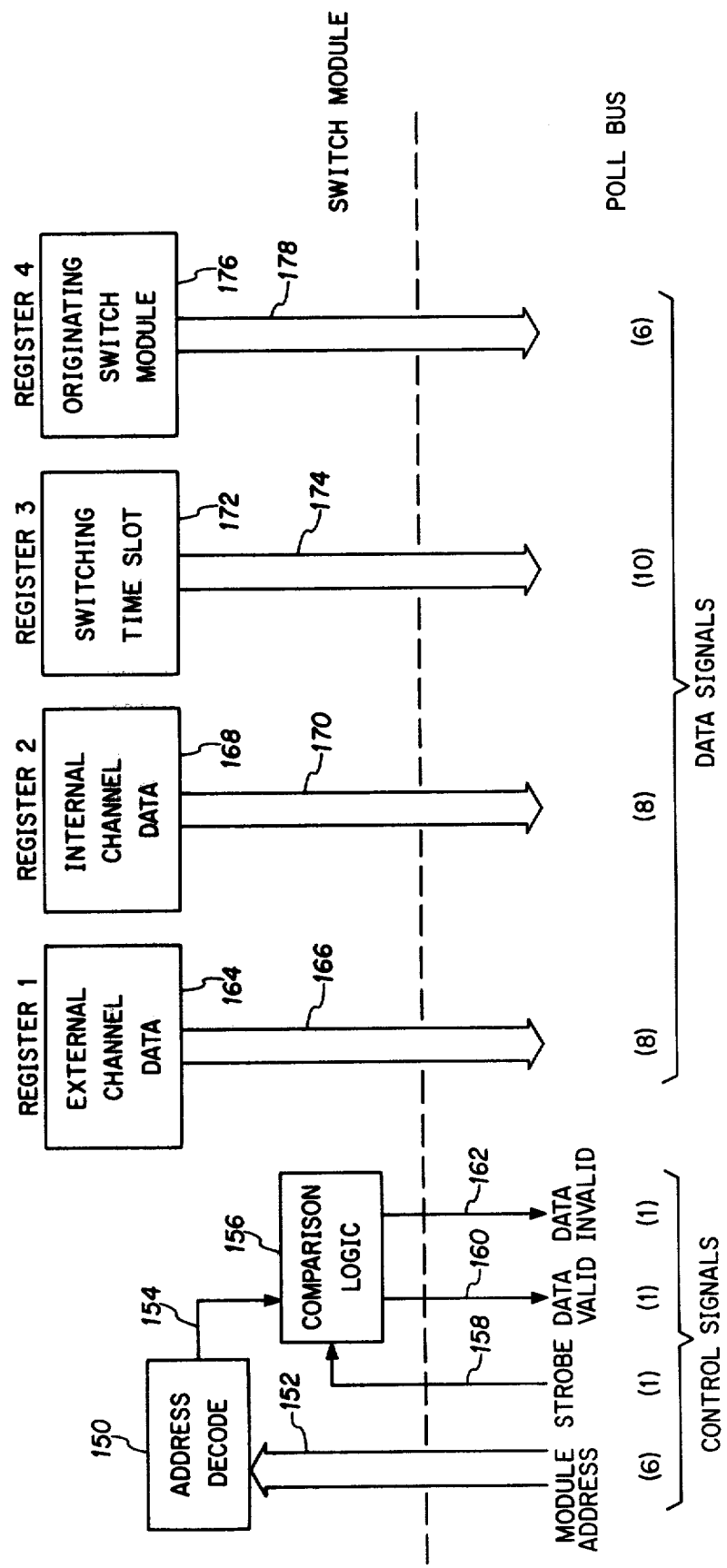
FIG. 4 illustrates the poll bus and switch module interface of the block diagram of FIG. 3.

In FIG. 4 the lower half of the figure represents the poll bus while the upper half represents components contained in each of the switch modules. As illustrated, an address decode block 150 receives module addresses on a plurality of leads 152. An output of the address decode block 150 is supplied on a lead 154 to a comparison logic block 156. Comparison logic block 156 receives strobe pulses on a lead 158 and outputs a data valid signal on a lead 160 or a data invalid signal on a lead 162. The plurality of leads 152 provides six bits of digital information while each of the leads 158 through 162 transmits one digital logic bit. Also within the switch module is a register 1 numbered 164 and designated as an external channel data block. This register provides output signals to the poll bus on a plurality of leads 166 for outputting eight bits of data representing a digital communication word. A register 2 numbered 168 and labeled internal channel data provides an additional eight bits of output signals representing a different digital communication word on a plurality of leads 170. A switching time slot block 172 and further designated as register 3 provides ten digital bits of data on a plurality of leads 174. Finally, an originating switch module 176 and further designated as register 4 provides six digital bits of output data on a plurality of leads 178.

FIG. 5 illustrates the restore bus 110 as connected to registers and other blocks in each of the modules. A six bit module address line 200 supplies signals to an address decode block 202 which also receives strobe pulses on lead 204. Address decode block 202 provides output signals in the form of an acknowledge signal (ACK) on a lead 206. This acknowledge signal is returned to the service restoral unit for the appropriate side. The acknowledge lead 206 is also supplied to an intermodule bus control memory update logic block 208. Signals are passed between block 208 and a multiplex (MUX) control memory block 210 via a plurality of leads 211. In one embodiment of the invention, block 210 has room for 48 digital words wherein six bits of each word provides module select information, one bit of each word is a channel selector bit and the final bit is a report disable bit. The previously referenced leads, which form a portion of the restore bus, were all control leads. In addition to the control leads, there are a plurality of leads in bus 212 which form six bits of referenced module data and these bits are supplied to a referenced module block 214 which is also designated as register 5. A lead 216 supplies one bit of data at a time to an external data select register (EXT) 218 which is also labeled register 6. A time slot comparison disable data bit is supplied on a lead 220 to a disable block (DIS) 222 also labeled register 7. Finally, a data bit indicative of disable all time slot reports is supplied on a lead 224 to an appropriate register block 226 labeled ALL and additionally labeled register 8.

The service restoral unit itself is illustrated in more detail in FIG. 6 and comprises a poll bus generally designated as 250 and comparable to either poll bus 112 or 126 in FIG. 3. Data is received on a plurality of leads 252 in the poll bus as obtained from registers 1 through 4 in FIG. 4. These data signals are supplied to a decode block 254 which provides as outputs a control lead 256 and a plurality of leads 258. The leads 256 and 258 are supplied to a distributor block 260. The signals appearing on leads 258 are either the failure message or the failure message plus channel data information. When there is "channel data" on lead 258, it comprises eight bits of message of the failed module and it is sent only on the report bus 276 for purposes of informing maintenance personnel to aid in making repairs and to log the type of failure. The poll has 250 also supplies and receives control signals via leads 260 which would be comparable to the leads 152, 158, 160 and 162 in FIG. 4. These signals are supplied to a poller block 262 which sequentially, as time permits, addresses all the switch level modules for a given side. Poller 262 provides data valid signals on a lead 264 to decode block 254 and receives hold signals on a lead 266 from distributor 260. The distributor 260 provides output failure messages on a plurality of leads 268 to an inter SRU bus-output plurality of leads generally designated as 270. Control signals are passed to and received from this bus 270 on a set of leads 272. The distributor supplies failure messages and control data on a set of leads 274 to a report bus 276. Report bus 276 is comparable to bus 138 of FIG.. 3 while bus 270 compares to bus 130 of FIG. 3. A set of control signals is passed between distributor 260 and report bus 276 on a set of leads 278. Failure messages are also supplied from distributor 260 on a set of leads 280 to a selector block 282. Control signals are passed both ways between these blocks on a set of leads 284. Return to service messages are supplied from a return bus 286 on a set of leads 288. Control signals are passed in both directions between bus 286 and selector 282 via a set of leads 290. Failure messages and return to service messages are passed from selector 282 to a matrix service block 292 via a set of leads 294. Control signals are passed in both directions between these blocks on a set of leads 296. Failure messages are received from a similar selector in the other service restoral unit via an inter SRU bus-in 298 on a set of leads 300. Control signals are passed in both directions on inter SRU bus-in via a set of leads 302. The matrix service block 292 supplies signals to a CMU bus 304 which would be comparable to bus 102 of FIG. 3 and signals are passed in both directions on a plurality of leads 306 which acts as the restore bus 110 of FIG. 3.

FIG. 7 illustrates in more detail the matrix service block 292 of FIG. 6. A plurality of leads labeled polled/destination module 310, a plurality of leads labeled failed/restored module 312, an external/on-line lead 314 and a fail/restorage message lead 316 comprise essentially the return to service or failure message bus 294 of FIG. 6. Accordingly, these leads are designated in FIG. 7 as 294'. The set of leads 310 and 312 are both applied to an address compare block 318 and both are output to an addressed module using the labels of module address and referenced module in the restore bus. Similarly, lines 314 and 316 are output as part of the restore bus with the respective labels external data select register 6 and time slot comparison disable register 7. Lead 316 is additionally applied to a logic block 320 and to a CMU bit select block 322. An output of address compare block 318 is designated 324 and is also applied to blocks 320 and 322. The set of leads or bus 310 further provides input signals to CMU bit select block 322. A matrix service control block 326 receives control messages on a bus 296' and outputs signals on a lead 328 which is connected to block 322. Control block 326 outputs strobe signals on a lead 330 to the restore bus and receives acknowledge signals (ACK) on a lead 332 from the restore bus. The final signal utilized in the restore bus is a disable all time slots register 8 lead 334 which receives signals for the logic block 320. The CMU bit select block 322 provides a plurality of output signals on a bus 336 to a CMU register block 338 which holds information on the basis of two bits per module. This block 338 provides output signals on a CMU bus 340.

FIG. 9 is very similar to FIG. 1 except that it is presented in a space-space-space configuration rather than the time-space-time configuration of FIG. 1. As illustrated, input signals are provided on a set of leads 400 to sample and hold blocks 402 and 404. Sample and hold block 402 provides a plurality of outputs to a programmable multiplex 406. Multiplex circuit 406 is programmed from a source not shown, but which source will allow the programmable unit to be changed as the methodology of connection from digital or other quickly accessed input signals. The output of MUX 406 is supplied to one input of an interlevel MUX 408 and is also provided to other modules within the switch system on line 410. As shown, the MUX 408 also receives other inputs from other remote side A modules. The sample and hold 404 provides a plurality of signals to a programmable MUX 412 which supplies outputs on a lead 414 to an interlevel MUX 416. The blocks 402, 406 and 408 and 410 are included within a input logic switch-side A generally indicated as 418 while the remaining components are within block 420 and are labeled input switch logic-side B. The outputs of these two blocks are shown on leads 422 and 424 respectively, and are illustrated as both being supplied to a channel selector for side A, indicated as 426, and also to a side B channel selector 428. Likewise, both of the signals are supplied to side A and side B data comparison circuits 430 and 432 respectively, which each supply signals to a failure recognition circuit 434. An output of selector 426 is supplied to a programmable demultiplex block 436 which provides a plurality of signals to a sample and hold block 438 within an output switch logic block-side A shown in dash lines as 440. A plurality of output leads from sample and hold 438 and thus of the output switch logic 440, are provided to an output selector 442. A similar configuration shows input signals from side B channel selector to a programmable demultiplex 444 within a dash line block 446 labeled output switch logic-side B. A plurality of outputs from demultiplex 444 is supplied to a sample and hold 448 which supplies a plurality of outputs to the output selector 442. Finally, a plurality of output signals generally indicated as 450 are supplied from the output selector 442 as single channel data outputs.

OPERATION

As indicated previously, FIG. 1 illustrates a combination side A and side B module or single switch level of an overall switch matrix. FIG. 2 illustrates a plurality of the modules of FIG. 1 and illustrates n levels. In a preferred embodiment of the invention, 64 switch modules were used to comprise an entire switch matrix. If each of the switch modules can handle 24 channels of data inputs, there is a possibility of shutting down 1,536 duplex voice channel lines if the switch matrix fails. If the data channel inputs are telex lines where each switch level handles 480 data channels, the interruption will result in the loss of approximately 30,720 messages.

Therefore, this invention comprises a circuit to enable isolation of failed portions of switch matrix equipment so that normal switching operations can continue without interruption. As illustrated in FIG. 2, the switch matrix is a dual switch matrix. The term "dual" means that two identical switch matrices are used, one to switch the communication data (this one is referred to hereinafter as the "on-line matrix") and one which will become the on-line matrix in the event of hardware failure in the present on-line matrix and which hereinafter will be referred to as the "standby or off-line matrix". The switchover circuits control which of the matrices is on-line. A failure in either side of a matrix results in that side of the matrix being assigned to reserve status and an alarm being given so as to notify appropriate personnel that there is a problem which needs to be corrected. The switchover circuits have a feature which allows the on-line matrix and the standby matrix to be controlled in a modular fashion. That is, if a module of the on-line matrix fails, then only the corresponding module of the standby matrix needs to be switched in to carry traffic. This feature of modularity greatly enhances the performance of the switch matrix under conditions of multiple failures and reduces the burden on maintenance personnel in their attempt to have a 100% standby operational unit.

As illustrated in both FIGS. 1 and 2, as well as FIG. 3 to an extent, each switch level module comprises a side A and a side B. As designed, either side A or side B can be the on-line matrix and the other can be the standby matrix. In fact, one embodiment alternated between using side A as the on-line matrix on a given day and on alternate days using side B as the on-line matrix. This design approach causes use of those circuits which are only used in the on-line mode of operation but are on the standby matrix if there is no daily alternating of matrices from on-line to standby. In this way, no circuit can fail while unused and remain undetected until a different observable failure requires its use. If failure occurs in one of the modules, the side of that module with the failure is assigned to be standby and the other side takes over the duties. An intermodule bus illustrated as the line entitled "From Remote Side A or Side B Modules" in FIG. 1 and illustrated as a set of lines entitled "Interlevel Bus" in FIG. 2 connect this plurality of dual modules together to form a large switching array. This bus acts to transfer many data channels between modules by using time division multiplexing techniques.

As will be realized, the overall function of the switch is to connect any specific input channel to any specific output channel. The designated input channel may be connected to an output channel on the same or in a different switch module. By connecting two of these paths through the switch matrix for a particular call, a full duplex connection can be made.

As will be noted, each of the switch level modules, as shown in FIG. 1, have two switchover or selector circuits such as 42 and 44 for the channel selector or 70 for the output selector. The output selector 70 is located just prior to the single channel data outputs. It is used to select data from either side A or side B of the switch module. If side A is inoperative then the data is selected from side B. In this way side A can be repaired without affecting the data switching. The selectors 42 and 44 are also required to switch traffic under failure conditions. If side A, remote from the one shown in FIG. 1, were to fail, for example, the channel selector 44 of the module shown in FIG. 1 would still need to select some input signals received from lines 26-28 by interlevel multiplex 22 on side A to be transmitted out through the output switch logic 78. The reason for this is that while side B, the standby matrix side of the switch, can pass the input signals from input 10 that are to be output on 84 entirely through the side B side of the module, and although it can receive most of the input signals from other switch modules on lines 36-38, if another switch module, different from either the one of FIG. 1 or the one with the failed side A, had a side B fail, this switch module would, of necessity, have to use side A in order to transmit any information to be output on single channel data outputs 84. Thus, the channel selector 44 will, of necessity, be required to input data from the interlevel multiplex 22 for some data channels. It is realized that this circuit will be interrupted if a failure should occur in the switch module of FIG. 1, on either side A or side B. However, due to the type of failures normally incured in switching matrices, the probability of having two simultaneous failures between the remote side A module inputs and through the intermodule multiplex 22 is very low as compared to correctable failures resulting in no traffic loss through the matrix. Thus, the probability is such that communications to other switch levels can be maintained from the side A interlevel multiplex 22 even though side A in general has failed.

It may be assumed that all the output selectors 70 of all the switch levels in FIG. 2 are positioned so that the output selector 70 accepts data from only one side A. It may also be assumed for the time being that all the modules have the channel selectors such as 42 in FIG. 1 set to select all channels from only side A. Likewise the modules on the side B side have the channel selectors set to select channels from only side B. This is a normal setting for non-failure conditions when side A is the on-line matrix.

If a failure occurs in side A of switch level 1, corrective action must be taken to prevent loss of data. If the failure is such that it interrupts all of side A's circuits in only switch level 1, such a failure is classified as a "single point failure". If no action is taken, all the data originating as an input to switch level 1 on inputs 10' are lost and likewise all the data which is to output on outputs 84' from switch level 1 are lost. It should be mentioned that in normal operation even the standby unit is continually passing data through the entire side and it is merely supplied by output switch logic side B to the selector 70 and not passed to the output 84. Thus, if the output selector 70' is set to accept data from side B, all circuits on side B as received from input 10' are correct. Further, since the channel selectors of side B are operated in conjunction with the channel selectors of side A, the data being received from other switch levels by side B of switch level 1 is also correct and thus the outputs on 84' of level 1 provide output data with no interruption in service. However, a more detailed examination of FIG. 2 will show that data from the failed side A of switch level 1 is also routed over the intermodule bus side A to the other side A switch modules on levels 2-n. These other switch level modules must now select data from only interlevel bus side B in order to avoid the erroneous data from level 1 side A. Thus, the channel selectors of each of the other switch modules are set to select from side B those channels originating from switch level 1. The other channels are still selected from side A. The output selectors 70 of each of the switch levels 2-n will continue to select data from only side A even though switch level 1 will have its output selector 70 selecting data from side B. All service has now been restored to the switch matrix and side A of switch level 1 is ready to be repaired.

A dual failure is defined as two single point failures at the same time in one section of each of two different switch module levels. The types of dual failures are: (1) side A and side B of the same module, (2) side A of a module of one level and side A of a module of a different level (i.e., same side of two different levels), and (3) side A and side B of modules in different levels. For a type (1) dual failure, complete service restoral is not possible. In other words with both sides of the same module inoperative, all traffic originating from that module or traffic destined to that module is lost because no operative hardware is available for these output channels.

For a type (2) dual failure, complete service restoral is possible. The output selector of each of the failed switch modules is set to select all the data from side B. The channel selectors of all non-failed switch modules are set to receive channel data from side B for channels originating from the failed switch modules and all other channel selectors are set to select data from side A.

For a type (3) dual failure, complete service restoral is not possible. However, traffic loss can be limited to the traffic exchanged between the two failed modules over the interlevel bus.

To restore service after a type (3) dual failure, the channel selectors and output selectors are set as for a type (2) failure with the failure in the side B module being ignored. With this type of setting the data traffic between failed side A module and all non-failed modules is completely restored as was the case for a type (2) failure. All traffic between the failed side B module and all the non-failed modules is also restored because the failed side B interlevel bus is in a standby status and is not accessed by and non-failed modules. As indicated previously, all output selectors select side A. Traffic between the two failed modules must use the interlevel bus for either side A or side B. Side A cannot be used because one of the failed modules is inoperative on side B. Thus, the mutual traffic between the failed modules is lost.

As may be determined, the advantage of the switchover circuits and, in particular, the channel selectors and the output selectors such as 44 and 70 can be seen in terms of lost calls per failure. Without either the channel selector 44 or the output selector 70, no failures can be tolerated and the only reason for having a standby switch matrix is to reinitiate all calls from scratch and thus have complete duplication of equipment.

For the purposes of discussion, we may assume that there are (C) active channels on the input 10 to each switch level of the switch matrix. Further, there are (C) active channels on the output of the switch module for each switch level. If there are then n dual switch modules, a total maximum of 2C simplex connections may be lost for every module failure which cannot be corrected. If only the output selectors are used, all single point failures can be restored. In other words, every output selector 70 is set to the same side-side A if the failure is in side B or side B if the failure is in side A. Further, if only the output selectors 70 are used, some of the dual failures can be restored as long as the dual failures are on the same side of the respective switch levels. It has been found that the type (1) failures as previously defined occur approximately $\frac{1}{2}n-1$ times in all dual failures. For this number of dual failures complete service cannot be restored. The type (2) failures occur in about $(n-1)/(2n-1)$ of all dual failures. Of these failures complete service can be restored. The type (3) failures also occur in about $(n-1)/(2n-1)$ of all the dual failures. As previously indicated, complete service cannot be restored and as a result there is a total of a maximum (not a normal) 2C lost simplex connections per incident. If n is much, much greater than 1, then a maximum of 2C lost simplex connections may happen for approximately one-half of all dual failures if only the output selector 70 is used to switch between sides. When the channel selector such as 44 is added along with the output selector 70, the loss due to dual failures is reduced. For the type (3) dual failure, service is restored except for traffic between the two failed levels. For one failed module there are approximately C/n active channels destined for the other failed module where C is defined as the active channels per level. Likewise, about C/n active channels are destined for it from the other failed module as an overall long term average. The total maximum loss on the average is then limited to 2C/n lost simplex connections. Thus, the use of the channel selector such as 44 reduces the lost simplex connection rate by a factor of n. For typical installations n may range from 10 to 64 thereby giving a significant service improvement for these dual failure cases.

Thus far the discussion has centered on the overall circuit operation, the problems if a failure occurs and the sequence of operations necessary to minimize the number of circuits lost due to failures. As will be realized, some means must be provided to detect a failure and to restore service once failure has been detected. In FIG. 3 service restoral units 100 and 114 are illustrated as being connected between the various switch level modules 1—n and a control processor 136. The control block 90 of FIG. 2 forms a portion of the service restoral unit and control processor functions and the rest of the control function inputs in the apparatus of FIG. 2 have been left off to reduce the complexity of these drawings. However, the operation of the switch module failure detection and service restoral functions will be clear from examining the following figures.

It has been found in the past that the largest majority of failures result in the generation of words having all logic zeroes or all logic ones. Thus, the data comparison circuits 46 and 48 have been inserted in each side of each of the switch levels to compare the words received from the interlevel multiplexers as output by each of the input switch logic blocks side A and B. If there is a noncomparison, a signal is output to the failure recognition circuit 56 over output leads 52 and 54. The failure recognition circuit 56 corresponds to the service restoral unit of FIG. 6. A further set of circuitry in the service restoral unit then provides a check on the same words.

As illustrated in FIG. 8, the flow diagram of the service restoral unit (SRU) operates to check for data comparison errors. As long as there is no error the circuit keeps cycling. However, if there is a discrepancy between the A and B side words, a check is made to see if one side is all zeroes or all ones or, in the alternative, an unused code. If all ones or all zeroes are found on the B side, then registers 5–8 of the switch module poll are so informed that the B side is in a failed condition and appropriate action or alarms are provided. On the other hand, if the failure is shown to be on the A side, the failed side indicator is set to A and the circuitry proceeds to the next decision point of the input level equaling the output level.

The SRU is able to determine the input module and the output module involved in the connection which has failed switch equipment in its connection path. The output module is the module currently being polled. The input module is the information in register 4 at the time of the poll.

If the input level (register 4) does not equal the output level (polled module), information is written to registers 5–8 of the polled module that the A side has failed on the input switch logic of the input module. The polled module adjusts its channel selector. The SRU circuitry again returns to the start position.

If on the other hand the input level and the output level are equal, then obviously the polled module has failed. A message is sent to the output selector of the polled module to "switch out" the failed side A. A report is supplied for maintenance repairmen to correct side A and the circuitry again returns to the start position for polling the modules. While a preferred embodiment of the service restoral unit lies in a software implementation, the circuitry of FIG. 6 in conjunction with FIGS. 4 and 5 illustrates the operation of the flow diagram of FIG. 8.

The service restoral units 100 and 114 of FIG. 3 are designed to provide detection of switch module failures and to provide restoral of calls which have been affected by the failure. As illustrated, two SRU units are utilized for each switch matrix level wherein one unit controls the A side of the switch matrix level and the other unit controls the B side of the switch matrix level. As illustrated, there are CMU buses, restore buses and poll buses connecting the service restoral units to their respective side switch modules for each of the levels.

When a failure in a switch module occurs, detection circuits such as failure recognition circuit 56 in the on-line module are activated. The SRU polls each module for this failure information on a sequential basis. If there is a possible failure, the failure data is transferred to the SRU over the poll bus. The SRU verifies the failure and then transmits a failure message to the other SRU and to the control processor 136. If the A side has been the on-line matrix, and it is a module in this side that has failed, the A side SRU restores service to the matrix by changing the control memory of the polled A side module to reflect that it should not receive any more information from the A side module which has failed but rather should receive information from that module on the B side. Simultaneously, the B side SRU changes the polled B side module to reflect the same information. The memory changes are effected over the restore bus such as 124 and 110 and the CMU bus such as 102 and 116 from each of the respective SRUs. The isolation procedure of the failed switch module is in accordance with information provided supra.

After repairs have been made manually to the failed switch module, it is returned to service. The return to service message is input from the control processor 136 over the return bus to the SRU whereby the switch module memories are returned to the condition prior to failure and again only side A modules are utilized in the switching operation.

The purpose of the poll bus such as 112 is to poll modules and to transfer failure data from each switch module to the SRU for analysis. Each switch module in each level compares channel data being switched through that module with channel data being switched through its back-up level module. The channel data switched through that module is "internal data" while the data from the back-up or standby module is "external data".

During each switching time slot, the data which originates on the A side is compared with the data originating on the B side in each of the data comparison circuits 46 and 48. If this channel data does not compare identically, then a report of the miscompare is made to the appropriate SRU. This report is made on all miscompares with only four exceptions for one embodiment of the invention and only three of these exceptions are believed of enough interest to be discussed in connection with this patent application. First, if the module is in a standby mode (not on-line) no report is made. Secondly, if the module is on-line but the data coming from a standby module over the interconnecting data bus is known to be correct, then no report is made for that data. And finally third, if either of the data code words corresponds to the idle (no connection made) code word of (00000001), then no report is made. As will be realized by those skilled in the art, the idle condition is where there is no information being transmitted.

FIG. 4 illustrates the poll bus interface at the switch module. The SRU such as 100 polls the switch levels in a predetermined order whereby each switch module is polled by placing the module address (in one embodiment this was a six bit data word) on the poll bus and setting the strobe line 158 to a logic one. The addressed switch module (all of them are connected in parallel) responds by setting the data valid line 160 to a logic one if no comparison failures have been detected since the last strobe, or setting the data invalid line 162 to a logic one if a miscompare has occurred.

When the data valid line 160 is equal to a logic one, the SRU reads 32 bits of data from registers 1–4 or in other words 164, 168, 172 and 176. These registers contain the external code word at the time of the miscompare, the internal code word at the time of the miscompare, the time slot being used at the time of the miscompare and the number or address of the switch module from which the data originated. One embodiment of the poll bus was designed as a wired-OR bus using asynchronous acknowledgment. This design used standard logic packages.

After a switch module failure has been identified by one of the SRU's such as 100, a restoral message is sent to the polled module on the restore bus such as 110 to establish data paths which bypass the failed switch module. FIG. 5 illustrates the restoral bus interface at each switch module. The SRU sends a nine bit message to be stored in registers 5–8 (registers 214, 218, 222 and 226) by putting the address and data on the bus, setting the strobe to a logic one and waiting for an acknowledge signal from lead 206 from the addressed module. The acknowledge signal indicates that the message is stored.

After the message is received by the switch module, the message contents are used to update the control memory of the multiplexer such as interlevel multiplexer 22 on side A of FIG. 1. This information is stored in the multiplex control memory 210 of FIG. 5. The multiplexer control memory 210 contains eight bits of information for each switching time slot. The first six bits (module select) identify which of the switch module interlevel buses is to be selected during that particular time slot. That is, the six bits identify the originating switch module for this time slot connection. One bit of the eight bits (select) describes whether the channel selector is to select channel data from the local interlevel bus or from the backup interlevel bus via the interconnecting data bus. The last bit of the eight bits (disable) determines whether a data comparison report is to be made during this time slot. Comparison reports are disable if the originating module is already known to be failed as previously mentioned.

These eight bits of the multiplex control memory are updated using the SRU message. The switch module searches through the multiplex control memory for all "module select" entries which match the six bits of register 5. For each occurrence of correspondence, the contents of register 6 are loaded into the "select" bit, and the contents of register 7 are loaded into the "disabled" bit. As will be realized, there may be more than one correspondence.

The information in register 8 is ignored if it is a logic zero value. If it is a logic one, the contents of register 7 are to be used to disable the reporting of all failures on the poll bus. Register 6 and register 7 are loaded as previously described, using the contents of register 5.

The CMU bus 102 of FIG. 3 comprises a pair of wires for each of the modules in one embodiment of the design. Thus, there are two separate wires for each module connected between the module and the service restoral unit such as 100. The switch module interprets whether it is on-line or standby in accordance with the logic values set forth in Table 1.

TABLE 1

| Wire 1 | Wire 2 | Meaning |
|--------|--------|---------|
| 0 | 0 | reset (power on clear) |
| 0 | 1 | standby |
| 1 | 0 | on-line |
| 1 | 1 | no change |

The standby/on-line status of the switch module is used to control the switch position of the output selector 70 of FIGS. 1 or 2.

The on-line side of the module inserts a different frame pattern in the passing data than does the standby side of the module. The output selector 70 incorporates monitoring equipment for checking the two different frame patterns. The output switch is set according to the following Table 2 in one embodiment of the invention.

TABLE 2

| Side A Frame | Side B Frame | Selection |
| --- | --- | --- |
| On-line | Standby | A |
| Standby | On-line | B |
| On-line | Changes to on-line | B |
| Changes to on-line | On-line | A |
| Standby | Standby | No change |

As will be determined, the net function of the CMU bus is to control the signals passed by output selector 70 and this is accomplished with the two wires in the CMU bus which affect the data frame pattern and accordingly adjust the output selector.

The service restoral unit of FIG. 6 monitores each switch module for failure conditions, determines which module has failed, switches this module out of service while activating the other module, and reports the failure to the control processor. After the failed module has been repaired, the repairmen may return the module to service using the service restoral unit 100 to affect the return.

As illustrated, FIG. 6 shows the service restoral unit (SRU) interfaces and a breakdown of the SRU functions. The logic in poller 262 sequentially generates the module addresses for transmittal on the poll bus 250 which would be the same as 112 of FIG. 3. When ever a "data valid" signal is returned from a switch module (via the control portion 260 of the poll bus 250), the poller 262 enables a decode of the data signals by the decode logic 254. If the decode logic 254 determines a module failure, a "failure message" is generated and sent to the distributor via a set of leads 258. Otherwise, the poller 262 sequences on and polls the next switch module in a preset schedule.

The decode logic 254 uses as inputs the data signals of the poll bus as received on the set of leads 252 and as obtained from the individual modules as illustrated in FIG. 4. The decode logic also uses as an input the polled level address which is input from the poller on a set of leads not numbered but labeled as "polled address". The failure message generated by the decode logic 254 comprises six bits identifying the failed module (in other words, substantially the same word as found in register 4 of FIG. 4), one bit identifying whether the failure is in the same matrix side (internal for the same side and external for the other side), six bits identifying the polled level address, and one bit identifying that this message is a failure message. The decode block 254 bases the decision in accordance with the following. If the register 1 data on the poll bus contains eight ones or eight zeroes, then the failure is external. If the register 2 data on the poll bus contains eight ones or eight zeroes, then the failure is internal. If neither of these conditions exist, then no failure message is generated.

The distributor 260 receives the failure message from the decode logic 254 on the set of leads 258 and distributes it to the other SRU such as 114 of FIG. 3 via the inter-SRU bus out 270, to the control processor via the report bus 276, and to the matrix service logic 292 through the selector 282 via the sets of leads 280 and 294. While the distributor 260 distributes the failure message to these three destinations, the poller 262 is temporarily held to prevent further polling cycles.

The inter-SRU bus 270 in combination with inter-SRU bus in 298 is used to exchange failure messages between both SRUs because both sides of the matrix must be changed via their respective restore and CMU buses and because only one SRU may detect a failure as the preferred embodiment was designed.

The report bus such as 138 or 140 provides a vehicle to report failures to maintenance personnel and to update the control processor of the current switch matrix status.

The logic within selector 282 sequentially selects incoming messages for delivery to the matrix service unit. These inputs may be from the inter-SRU bus in 298 and the return bus from the control processor 286 as well as from a distributor 260. The selector 282 delivers the received message to the matrix service unit 292. If the received message is a failure message from the distributor 260 or from the inter-SRU bus in 298, the failure message is delivered to the matrix service 292 unaltered with the exception that if the message originated from the inner-SRU bus in 298, the internal/external bit as discussed in connection with register 6 of FIG. 5 is toggled to the opposite value.

The received message may also be a return to service message, input from the return bus 286. The format of this message is similar to the format of the failure message. It comprises six bits identifying the destination module address, six bits identifying the module to be returned to service, one bit identifying whether the module is to be on-line or standby, and one bit identifying that this message is a return to service message. The selector delivers the received message to the matrix service unit 292 unaltered. The matrix service unit 292 includes logic for removing or restoring a switch module from service by using the CMU bus 304 and the restore bus 306. For each failure message or return to service message, a restoral message is sent to one module via the restoral bus 306 and bit values may be changed in a CMU register which controls the CMU bus 304.

FIG. 7 provides additional details on the logical functions of the matrix service unit 292. As is obvious from FIG. 7, the module address output on the restore bus is the same as the polled module address of the failure message that is input on 294'. The referenced module signals (register 5 of FIG. 5) is identical to the address of the failed module as input on 312 from bus 294'. The external data select is also identical as is the time slot comparison disable line 316. The signals for register 8 on lead 334 are set to a condition for "disable all" if the polled level address of 310 is identical to the failed module address of 312. This comparison is provided by address compare block 318. The two bits of the addressed module 338 are altered only if the polled level address received on 310 by CMU bit selector 322 is identical to the failed module. If so, the two CMU bits are set to "on-line" if the failure is "external" and otherwise it is set to "standby". The above paragraph delineates the settings when a "failure message" is received by the matrix service unit 292. However, if the message received is a "return to service" message, the following changes are provided. The module address on 310 is the destination module address as directly indicated in the received return to service message. Register 5 is set to the address of the restored module and register 6 is set to "external" or "internal" as indicated in the return to service message and as provided previously. Register 7 is set to "enable" and the output logic on 334 from logic device 320 is set to "not disable all". Finally, the two bits of the addressed module 338 in the CMU register are altered only if the destination module is identical to the restored module. If so, the two CMU bits on 340 are set to "on-line" or "standby" according to the corresponding bit in the return to service message.

A U.S. Pat. No. 3,809,819 illustrates a space-space-space switch issued in the name of Ray Stevens. The diagram of FIG. 9 is configured along the lines of a space-space-space stage switching system similar to that of the Stevens' patent to illustrate that the inventive concept is applicable to more than only a time-space-time switch. In view of the teachings of the cited patent, it is believed unnecessary to go into detail on this figure. However, it will be readily apparent from a reading of the above material that the input data is suppliejd to both side A and side B input switch logic blocks 418 and 420. Within these blocks it is space switched and applied to the interlevel MUX 408 or 416 if it is to stay within the illustrated switch level. If it is to go outside, it is transmitted on either line 410 or 414 to other modules. In a manner similar to that illustrated previously, it will normally be provided on one side unless that side is shown to be faulty via logic circuits in the data comparison block. The signal is then normally output on one side through the channel selector and applied to a programmable demultiplex which again provides space switching through sample and hold techniques before applying the signal to the output selector. Thus, the space-space-space switch will obviously have the same type of reliability as provided in the time-space-time switch described in the rest of the specification.

In summary, the invention comprises in part the use of modules having identical sides both of which are operating when there are no failures. However, the output signals from selector 70 are provided only from the on-line side during normal operations. When there is a failure in the standby side, nothing further happens except that a report is made so that the standby portion can be fixed and returned to service. When the on-line side of the module fails, the standby portion is immediately inserted with substantially no loss in messages.

As previously indicated, the prior art switching units were designed such that there was no modularity and if a minor portion of both the primary and standby switches failed, there was complete interruption of service. The design of the present device, however, allows the use of the A and B sides simultaneously to correct for failures in individual switch levels which may be on opposite sides of the switch matrix. The use of the channel selectors and output selectors may be advantageously used to, in many instances of dual failure, provide 100% operation and even in cases of a plurality of failures on both sides it will operate with merely reduced capability.

It will be apparent that many modifications and specific embodiments of the inventive concept will occur to those skilled in the art and, therefore, we wish to be limited only by the scope of the appended material wherein we claim.

We claim:

1. Apparatus for providing a level of time-space-time (TST) switching in a multilevel communication switching system wherein each level is substantially identical in manufacture comprising, in combination:

side A time-space stage switch means, including local signal input means and side A time stage switched interlevel input and output bus means and space stage switched signal output means;

side B time-space stage switch means, including local signal input means and side B time stage switched interlevel input and output bus means and space stage switched signal output means;

local signal input means for supplying input signals to be time stage switched to said local signal input means of both said side A time-space stage switch means and said side B time-space stage switch means;

means for supplying time stage switched signals from other levels to said side A interlevel input bus means for space stage switching;

means for supplying time stage switched signals from other levels to said side B interlevel input bus means for space stage switching;

side A data comparison means connected to said space stage switched signal output means of each of said side A and said side B time-space stage switch means for receiving space stage switched signals therefrom;

side B data comparison means connected to said space stage switched signal output means of each of said side A and said side B time-space stage switch means for receiving space stage switched signals therefrom;

error detection means connected to said side A and said side B data comparison means for providing output signals whenever the data received is not identical in format;

side A interlevel signal transmission means for providing output signals from said side A time-space stage switch means to other levels;

side B interlevel signal transmission means for providing output signals from said side B time-space stage switch means to other levels;

side A channel selector means, including first and second space stage switched signal input means, control means and output means;

side B channel selector means, including first and second space stage switched signal input means, control means and output means;

means for supplying signals from said space stage switched signal output means of both said side A and said side B time-space stage switch means to said first and second input means of each of said side A and said side B channel selector means;

side A time stage switch means, including time stage switched signal output means and signal input means connected to said side A channel selector output means for receiving space stage switched signals therefrom;

side B time stage switch means, including time stage switched signal output means and signal input means connected to said side B channel selector output means for receiving space stage switched signals therefrom;

output selector means, including control input means, TST signal output means and first and second TST input means connected respectively to said output means of said side A and said side B time stage switch means for receiving signals therefrom; and means connected to said control inputs of said side A and said side B channel selector means and said output selector means for normally throughputting signals on said side A except for interlevel signals received from side A failed apparatus on other levels.

2. A time-space-time (TST) communication switching system comprising a plurality of levels wherein each level has a primary TST module "A" and a backup TST module "B", each level receives local signals for application to said A and B modules, each level can output local and interlevel signals and there are A and B interlevel buses for transmitting multiplexed signals between corresponding A and B modules of different levels wherein the A and B modules are substantially identical and each comprise, in combination:

first time-space stage switch means, including local signal input means and interlevel input and output bus means and space stage switched signal output means;

local signal input means for inputting signals to be time stage switched to said local signal input means of said time-space stage switch means;

means for inputting time stage switched signals from other levels to said interlevel input bus means for space stage switching;

data comparison means connected to said space stage switched signal output means of said first time-space stage switch means for receiving space stage switched signals therefrom and including means for receiving space stage switched signals from another module of the same level;

means for providing output signals whenever the space stage switched signals received by said comparison means are not identical in format;

interlevel signal transmission means for providing output signals from said interlevel output bus means of said first time-space stage switch means to corresponding modules on other levels;

channel selector means, including first and second space stage switched input means, control means and output means;

means for supplying signals from said space stage switched signal output means of said first time-space stage switch means and supplying signals received from another time-space stage switch means of the same level to said first and second input means respectively of said channel selector means;

time stage switch means, including time stage switched signal output means and signal input means connected to said channel selector output means for receiving space stage switched signals therefrom;

means for supplying TST signals from said signal output means of said time stage switch means to a further selector means; and means connected to said control input of said channel selector means for selecting throughputting of signals between said first time-space stage switch means and said another time-space stage switch means.

3. A time-space-time (TST) multiplexing module for use in a communication switching system comprising, in combination:

time-space stage switch means, including local signal input means, interlevel input and output bus means and time-space stage switched signal output means;

local signal input means for supplying input signals to be time stage switched to said local signal input means of said time-space stage switch means;

means for supplying time stage switched signals from other levels to said interlevel input bus means for space stage switching;

data comparison means connected to said time-space stage switched signal output means of said time-space stage switch means for receiving space stage switched signals therefrom and including means for receiving similar time-space stage switched signals from another module of the same level;

means for providing output signals whenever the time-space stage switched signals received by said comparison means are not identical in format;

interlevel signal transmission means for providing output signals from said interlevel output bus means of said time-space stage switch means to corresponding modules on other levels;

channel selector means, including first and second space stage switched input means, control means and output means;

means for supplying signals from said time-space stage switched signal output means of said time-space stage switch means to said first input means of said channel selector means;

time stage switch means, including time stage switched signal output means and signal input means connected to said channel selector output means for receiving space stage switched signals therefrom;

means for supplying TST signals from said signal output means of said time stage switch means to a further selector means; and means connected to said control input of said channel selector means for selecting throughputting of signals between said first and second input means thereof.

4. The method of minimizing the switching system downtime due to circuit failures within a time-space-time (TST) switching system comprising, the steps of:

dividing the switching system into a plurality of substantially identical switching levels with at least one primary module and one backup module per switching level;

applying input signals to both modules on each level;

time stage switching the input signals in both primary and backup modules on each level;

space stage switching signals received from all levels to be output by a specific level wherein primary modules receive signals only from other primary modules and backup modules receive signals only from other backup modules;

selecting between a primary signal from a primary module and a backup signal from a backup module after space stage switching on the basis of (1) normally selecting primary signals when all primary modules of all levels are operative (2) temporarily selecting backup signals from other levels whose primary module is inoperative when the primary module presently selected for signal transmission is operative and (3) temporarily selecting only backup signals from other levels when the primary module presently selected for signal transmission is inoperative;

time stage switching the selected signals for each level; and outputting the TST multiplexed signals from an operative module on each level.

5. The method of increasing overall switching system signal throughput reliability comprising, the steps of:

dividing the system into a plurality of levels;
providing primary and backup switches at each level;
separately interconnecting the primary and backup switches with interlevel data communication buses; and
routing signals from levels having inoperative primary switches through the backup switches and backup interlevel buses to be output by primary switches on those levels whose primary and backup switches are both operative.

6. Apparatus for minimizing downtime due to circuit failures within a time-space-time (TST) switching system comprising, in combination:
a plurality of substantially identical switching levels each including at least one primary TST module and one backup TST module;
means for supplying input signals to both modules on each of said plurality of levels wherein the signals applied to the modules on a given level are identical;
primary and secondary time stage switching means within said primary and backup modules, respectively, for time stage switching signals input thereto;
primary and backup interlevel bus means for transmitting signals between levels wherein the primary bus is connected only to primary modules and the backup bus is connected only to backup modules;
means for space stage switching signals received from other levels with signals to remain in a given level;
channel selection means connected to the primary and backup modules in each level whereby space stage switched signals are normally selected from the primary module unless (1) a received signal is obtained from another level whose primary module is inoperative or (2) the primary module on the given level receiving the signals is inoperative;
means connected to receive signals from said selection means for time stage switching the received signals in each level; and
output means for outputting the TST multiplexed signals from an operative module on each level.

7. Apparatus for increasing overall switching system signal throughput reliability comprising, in combination:
a plurality of time-space-time stage switching levels, each including primary and backup switches;
means for interconnecting the primary and backup switches with separate interlevel data communication buses for exchanging communication signal after the first time stage switch and before the space stage switching; and
means for selecting between space stage switched signals in the primary and backup switches as a function of the operability of primary switches in each of the levels.

8. The method of minimizing the number of inoperative circuits due to circuit failures within a time-space-time (TST) stage switching system comprising, the steps of:
dividing the system into a plurality of substantially identical switching levels with at least one primary module and one backup module per switching level;
applying input signals to both modules on each level;
time stage switching the input signals in both primary and backup modules on each level;
space stage switching signals received from all levels to be output by a specific level wherein primary modules receive interlevel signals only from other primary modules and backup modules receive interlevel signals only from other backup modules;
selecting between primary and backup signals after space stage switching on the basis of (1) normally selecting primary signals when all primary modules of all levels are operative and (2) temporarily selecting backup signals from other levels whose primary module is inoperative when the present primary module is operative;
time stage switching the selected signals for each level; and
outputting the TST stage switched signals from an operative module on each level.

9. Apparatus for providing a level of multiple stage switching in a multilevel communication switching system wherein each level is substantially identical in manufacture comprising, in combination:
side A two stage multiplex means, including local signal input means and side A multiplexed interlevel input and output bus means and further stage multiplexed signal output means;
side B two stage multiplex means, including local signal input means and side B multiplexed interlevel input and output bus means and further stage multiplexed signal output means;
local signal input means for supplying input signals to be multiplexed to said local signal input means of both said side A multiplex means and said side B multiplex means;
means for supplying multiplexed signals from other levels to said side A interlevel input bus means for further multiplexing;
means for supplying multiplexed signals from other levels to said side B interlevel inpt bus means for further multiplexing;
side A data comparison means connected to said further stage multiplexed signal output means of each of said side A and said side B two stage multiplex means for receiving multiplexed signals therefrom;
side B data comparison means connected to said further stage multiplexed signal output means of each of said side A and said side B two stage multiplex means for receiving multiplexed signals therefrom;
error detection means connected to said side A and said side B data comparison means for providing output signals whenever the data received is not identical in format;
side A interlevel signal transmission means for providing output signals from said side A two stage multiplex means to other levels;
side B interlevel signal transmission means for providing output signals from said side B two stage multiplex means to other levels;
side A channel selector means, including first and second multiplexed signals input means, control means and output means;
side B channel selector means, including first and second multiplexed signal input means, control means and output means;
means for supplying signals from said further stage multiplexed signal output means of both said side A and said side B two stage multiplex means to said first and second input means of each of said side A and said side B channel selector means;

side A final multiplex means, including final multiplexed signal output means and signal input means connected to said side A channel selector output means for receiving multiplexed signals therefrom;

side B final multiplex means, including final multiplexed signal output means and signal input means connected to said side B channel selector output means for receiving multiplexed signals therefrom;

output selector means, including control input means, multiple stage multiplexed signal output means and first and second input means connected respectively to said output means of said side A and said side B final multiplex means for receiving signals therefrom; and means connected to said control inputs of said side A and said side B channel selector means and said output selector means for normally throughputting signals on said side A except for interlevel signals received from side A failed apparatus on other levels.

10. A multiple stage communication switching system comprising a plurality of levels wherein each level has a primary module "A" and a backup module "B", each level receives local signals for application to said A and B modules, each level can output local and interlevel signals and there are A and B interlevel buses for transmitting multiplexed signals between corresponding A and B modules of different levels wherein the A and B modules are substantially identical and each comprise, in combination:

first multiple stage multiplex means, including local signal input means and interlevel input and output bus means and multiplexed signal output means;

local signal input means for inputting signals to be multiplexed to said local signal input means of said multiple stage multiplex means;

means for inputting time multiplexed signals from other levels to said interlevel input bus means for further multiplexing;

data comparison means connected to said multiplexed signal output means of said first multiple stage multiplex means for receiving multiplexed signals therefrom and including means for receiving multiplexed signals from another module of the same level;

means for providing output signals whenever the multiplexed signals received by said comparison means are not identical in format;

interlevel signal transmission means for providing output signals from said interlevel output bus means of said first multiple stage multiplex means to corresponding on other levels;

channel selector means, including first and second multiplexed input means, control means and output means;

means for supplying signals from said multiplexed signal output means of said first multiple stage multiplex means and supplying signals received from another multiplex means of the same level to said first and second input means respectively of said channel selector means;

final multiplex means, including final multiplexed signal output means and signal input means connected to said channel selector output means for receiving multiplexed signals therefrom;

means for supplying multiple stage signals from said signal output means of said final multiplex means to a further selector means; and means connected to said control input of said channel selector means for selecting throughputting of signals between said first multiple stage multiplex means and said another multiple stage multiplex means.

11. The method of minimizing the switching system downtime due to circuit failures within a multiple stage switching system comprising, the steps of:

dividing the switching system into a plurality of substantially identical switching levels with at least one primary module and one backup module per switching level;

applying input signals to both modules on each level;

first stage multiplexing the input signals in both primary and backup modules on each level;

second stage multiplexing signals received from all levels to be output by a specific level wherein primary modules receive signals only from other primary modules and backup modules receive signals only from other backup modules;

selecting between primary and backup signals after second stage multiplexing on the basis of (1) normally selecting primary signals when all primary modules of all levels are operative (2) temporarily selecting backup signals from other levels whose primary module is inoperative when the present primary module is operative and (3) temporarily selecting only backup signals from other levels when the present primary module is inoperative;

third stage multiplexing the selected signals for each level; and outputting the multiple stage multiplexed signals from an operative module on each level.

12. Apparatus for minimizing downtime due to circuit failures within a multipe stage switching system comprising, in combination:

a plurality of substantially identical switching levels each including at least one primary module and one backup module;

means for suppling input signals to both modules on each of said plurality of levels wherein the signals applied to the modules on a given level are identical;

primary and secondary first stage multiplexing means within said primary and backup modules, respectively, for multiplexing signals input thereto;

primary and backup interlevel bus means for transmitting signals between levels wherein the primary bus is connected only to primary modules and the backup bus is connected only to backup modules;

means for second stage multiplexing signals received from other levels with signals to remain in a given level;

channel selection means connected to the primary and backup modules in each level whereby second stage multiplexed signals are normally selected from the primary module unless (1) a received signal is obtained from another level whose primary module is inoperative or (2) the primary module on the given level receiving the signals is inoperative;

means connected to receive signals from said selection means for final stage multiplexing the received signals in each level; and output means for outputting the multiple stage multiplexed signals from an operative module on each level.

13. Apparatus for increasing overall switching system signal throughput reliability comprising, in combination:
   a plurality of multiple stage switching levels, each including primary and backup switches;
   means for interconnecting the primary and backup switches with separate interlevel data communication buses for exchanging communication signals after a first stage switching operation and before a second stage switching operation; and
   means for selecting between second stage switched signals in the primary and backup switches as a function of the operability of primary switches in each of the levels.

14. The method of minimizing the number of inoperative circuits due to circuit failures within a multiple stage switching system comprising, the steps of:
   dividing the system into a plurality of substantially identical switching levels with at least one primary module and one backup module per switching level;
   applying input signals to both modules on each level;
   first stage multiplexing the input signals in both primary and backup modules on each level;
   second stage multiplexing signals received from all levels to be output by a specific level wherein primary modules receive interlevel signals only from other primary modules and backup modules receive interlevel signals only from other backup modules;
   selecting between primary and backup signals after second stage multiplexing on the basis of (1) normally selecting primary signals when all primary modules of all levels are operative and (2) temporarily selecting backup signals from other levels whose primary module is inoperative when the present primary module is operative;
   final stage multiplexing the selected signals for each level; and
   outputting the multiple stage multiplexed signals from an operative module on each level.

15. A multiple stage multiplexing module for use in a communication switching system comprising, in combination:
   first and second stage multiplex means, including local signal input means, interlevel input and output bus means and second stage multiplexed signal output means;
   local signal input means for supplying input signals to be first stage multiplexed to said local signal input means of said first and second stage multiplex means;
   means for supplying first stage multiplexed signals from other levels to said interlevel input bus means for second stage multiplexing;
   data comparison means connected to said second stage multiplexed signal output means of said first and second stage multiplex means for receiving second stage multiplexed signals therefrom and including means for receiving similar second stage multiplexed signals from another module of the same level;
   means for providing output signals whenever the second stage multiplexed signals received by said comparison means are not identical in format;
   interlevel signal transmission means for providing output signals from said interlevel output bus means of said first and second stage multiplex means to corresponding modules on other levels;
   channel selector means, including first and second multiplexed input means, control means and output means;
   means for supplying signals from said second stage multiplexed signal output means of said first and second stage multiplex means to said first input means of said channel selector means;
   third stage multiplex means, including third stage multiplexed signal output means and signal input means connected to said channel selector output means for receiving second stage multiplexed signals therefrom;
   means for supplying multiple stage multiplex signals from said signal output means of said third stage multiplex means to a further selector means; and
   means connected to said control input of said channel selector means for selecting throughputting of signals between said first and second input means thereof.

* * * * *